(12) United States Patent
Kang et al.

(10) Patent No.: US 11,644,725 B2
(45) Date of Patent: *May 9, 2023

(54) DRIVING CIRCUIT AND DISPLAY DEVICE

(71) Applicant: LG DISPLAY CO., LTD., Seoul (KR)

(72) Inventors: SeongKyu Kang, Seoul (KR); SungChul Kim, Seoul (KR); HoonBae Kim, Daejeon (KR); SunYeop Kim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/520,143

(22) Filed: Nov. 5, 2021

(65) Prior Publication Data
US 2022/0057685 A1 Feb. 24, 2022

Related U.S. Application Data

(63) Continuation of application No. 15/931,401, filed on May 13, 2020, now Pat. No. 11,194,201.

(30) Foreign Application Priority Data

Jun. 20, 2019 (KR) .................. 10-2019-0073354

(51) Int. Cl.
*G09G 3/34* (2006.01)
*G02F 1/1362* (2006.01)
*G09G 3/36* (2006.01)

(52) U.S. Cl.
CPC ..... *G02F 1/136286* (2013.01); *G09G 3/3688* (2013.01); *G02F 2201/121* (2013.01); *G02F 2201/123* (2013.01)

(58) Field of Classification Search
CPC ......... G06F 2203/04102; G06F 3/0412; G06F 3/04164; G06F 3/0443; H01L 27/322; H01L 27/323; H01L 27/3276; H01L 51/0097; H01L 51/5206; H01L 51/5253
See application file for complete search history.

(56) References Cited

U.S. PATENT DOCUMENTS

2017/0357355 A1* 12/2017 Fukushima ......... G06F 3/04166
2018/0032190 A1* 2/2018 Koide ................. G02F 1/13338

FOREIGN PATENT DOCUMENTS

KR 10-2016-0102555 A1 8/2016
KR 10-2018-0078934 A1 7/2018

* cited by examiner

*Primary Examiner* — Insa Sadio
(74) *Attorney, Agent, or Firm* — Polsinelli PC

(57) ABSTRACT

A display device includes a plurality of gate lines; a plurality of data lines; a plurality of pixel electrodes electrically connected with the plurality of data lines; a plurality of common electrodes corresponding to two or more pixel electrodes among the plurality of pixel electrodes; a data driving circuit outputting data voltages to the plurality of data lines; and a driving circuit outputting a first driving signal with a first voltage level to at least one common electrode among the plurality of common electrodes during a first driving period and a second driving signal with a second voltage level and a third voltage level to the at least one common electrode during a second driving period, the second driving signal being a pulse signal, wherein the second voltage level and the third voltage level differ from the first voltage level.

16 Claims, 10 Drawing Sheets before enhanced → after enhanced

DRIVING CIRCUIT AND DISPLAY DEVICE

CROSS REFERENCE TO RELATED APPLICATION

This application is a continuation of U.S. patent application Ser. No. 15/931,401, filed May 13, 2020, which claims priority from Korean Patent Application No. 10-2019-0073354, filed on Jun. 20, 2019, which are hereby incorporated by reference in their entirety for all purposes as if fully set forth herein.

BACKGROUND

Field of the Disclosure

The present disclosure relates to a driving circuit and a display device.

Description of the Background

The growth of the intelligent society leads to increased demand for image display devices and use of various types of display devices, such as liquid crystal displays, organic light emitting displays, etc.

The display device recognizes the user's touch on the display panel and performs input processing based on the recognized touch so as to provide more various functions to the user.

An example display device capable of touch recognition may apply touch driving signals to multiple touch electrodes arranged or embedded in the display panel, sense a variation in capacitance caused by the user's touch, and detect whether there is a touch and, if so, the coordinates of the touch.

The touch electrodes may be arranged on the display panel and have display driving voltages applied thereto. As a touch driving signal is applied to the display driving electrodes, display driving may be not enabled during the period of sensing the touch or image quality abnormality may occur.

SUMMARY

The present disclosure provides a driving circuit and display device, which use an electrode for display driving as a touch electrode and are capable of performing touch sensing simultaneously with display driving.

The present disclosure provides a driving circuit and display device, which may prevent image quality abnormality due to application of a signal for touch driving to the display driving electrode.

According to various aspects of the disclosure, a display device comprises a plurality of gate lines, a plurality of data lines, a plurality of pixel electrodes electrically connected with the data lines, a plurality of common electrodes corresponding to two or more pixel electrodes among the plurality of pixel electrodes, a data driving circuit outputting data voltages to the plurality of data lines, and a driving circuit outputting a first driving signal with a first voltage level to at least one common electrode of the plurality of common electrodes in a first driving period and a second driving signal with a second voltage level and a third voltage level to the at least one common electrode in a second driving period, the second driving signal being a pulse signal. The second voltage level and the third voltage level differ from the first voltage level.

Here, the first voltage level may be higher than the second voltage level and lower than the third voltage level.

Or, the first voltage level may be lower than the second voltage level, and the second voltage level may be lower than the third voltage level.

Thus, when the data voltage corresponding to the same grayscale in the first driving period and second driving period is supplied, the difference between the data voltage and the voltage applied to the common electrode in the first driving period may differ from the difference between the data voltage and the voltage applied to the common electrode in the second driving period.

According to various aspects of the disclosure, a driving circuit comprises an electrode driver outputting a first driving signal with a first voltage level to at least one common electrode of a plurality of common electrodes embedded in a panel in a first driving period and a second driving signal with a second voltage level and a third voltage level to the at least one common electrode in a second driving period, the second driving signal being a pulse signal, and the electrode driver receiving a sensing signal from at least one common electrode to which the second driving signal has been applied in the second driving period and a sensing signal converter outputting sensing data into which the sensing signal received in the second driving period has been converted. The second voltage level and the third voltage level differ from the first voltage level.

According to various aspects of the disclosure, touch sensing and display driving may simultaneously be performed by supplying the data voltage modulated based on the touch driving signal in the period during which the touch driving signal is applied to the common electrode.

According to various aspects of the disclosure, the level of the voltage applied to the common electrode in the period during which no touch driving signal is applied may be set to differ from the voltage level of the touch driving signal, thereby preventing an image quality abnormality from occurring in the touch driving signal-applied period.

DESCRIPTION OF DRAWINGS

The above and features, and advantages of the present disclosure will be more clearly understood from the following detailed description, taken in conjunction with the accompanying drawings, in which.

DETAILED DESCRIPTION

Figure 1:
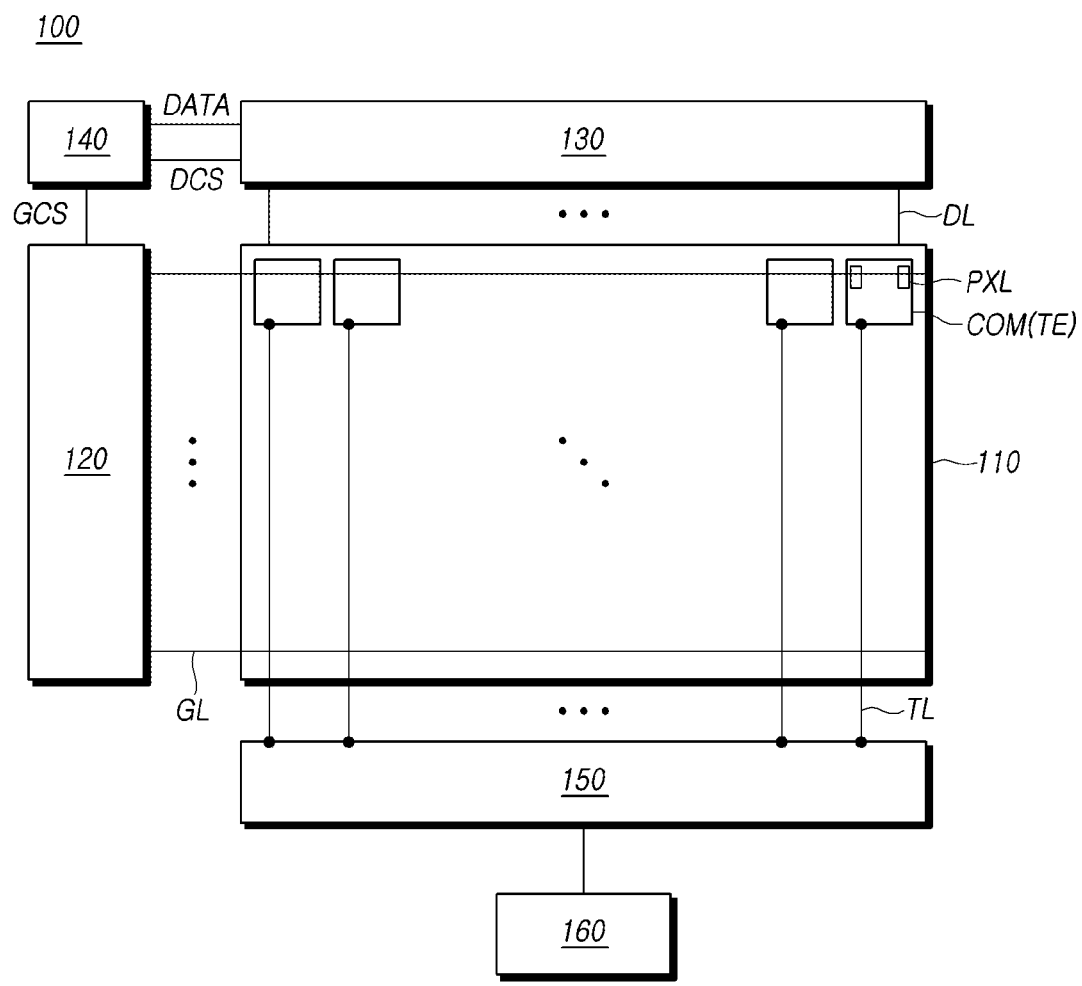
FIG. 1 is a view schematically illustrating a configuration of a display device according to the present disclosure.

In the following description of examples or aspects of the disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the disclosure, detailed descriptions of well-known functions and components incorporated herein will be omitted when it is determined that the description may make the subject matter in some aspects of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a view schematically illustrating a configuration of a display device 100 according to various aspects of the disclosure.

Referring to FIG. 1, according to various aspects of the disclosure, a display device 100 may include a display panel 110, a gate driving circuit 120, a data driving circuit 130, and a controller 140. The display device 100 may include a touch driving circuit 150 for sensing a touch on the display panel 110 and a touch controller 160.

The display panel 110 may include a plurality of gate lines GL, a plurality of data lines DL, and multiple subpixels SP at the crossings of the gate lines GL and the data lines DL. A pixel electrode PXL may be disposed in each subpixel SP.

Multiple touch electrodes TE may be arranged or embedded in the display panel 110, and multiple touch lines TL for electrically connecting the touch electrodes TE with the touch driving circuit 150 may be arranged on the display panel 110.

A configuration for display driving in the display device 100 is described first. The gate driving circuit 120 controls the driving timing of the subpixels SP arranged in the display panel 110. The data driving circuit 130 supplies data voltage Vdata corresponding to image data to the subpixels SP to allow the subpixels SP to represent a brightness corresponding to the grayscale of the image data, thereby displaying an image.

Specifically, the gate driving circuit 120 may be controlled by the controller 140 to sequentially output scan signals to the plurality of gate lines GL disposed in the display panel 110, controlling the driving timing of the subpixels SP.

The gate driving circuit 120 may include one or more gate driver integrated circuits (GDICs). Depending on driving schemes, the gate driving circuit 120 may be positioned on only one side, or each of two opposite sides, of the display panel 110.

Each gate driver integrated circuit (GDIC) may be connected to the bonding pad of the display panel 110 in a tape automated bonding (TAB) or chip-on-glass (COG) scheme or may be implemented in a gate-in-panel (GIP) type to be directly disposed in the display panel 110 or, in some cases, may be integrated in the display panel 110. Each gate driver integrated circuit (GDIC) may also be implemented in a chip-on-film (COF) scheme to be mounted on a film connected to the display panel 110.

The data driving circuit 130 receives image data (or input data) from the controller 140 and converts the image data into an analog data voltage. The data driving circuit 130 outputs a data voltage to each data line DL according to the timing of applying a scan signal via the gate line GL, allowing each subpixel SP to represent a brightness according to the image data.

The data driving circuit 130 may include one or more source driver integrated circuits (SDICs).

Each source driver integrated circuit (SDIC) may include, e.g., shift registers, latch circuits, digital-analog converters, and output buffers.

Each source driver integrated circuit (SDIC) may be connected to the bonding pad of the display panel 110 in a TAB or COG scheme or may be directly disposed in the display panel 110 or, in some cases, may be integrated in the display panel 110. Each source driver integrated circuit (SDIC) may be implemented in a COF scheme in which case each source driver integrated circuit (SDIC) may be mounted on a film connected to the display panel 110 and be electrically connected with the display panel 110 via wires on the film.

The controller 140 supplies various control signals to the gate driving circuit 120 and the data driving circuit 130 and controls the operation of the gate driving circuit 120 and the data driving circuit 130.

The controller 140 enables the gate driving circuit 120 to output scan signals according to the timing of implementing each frame, converts image data received from the outside to meet the data signal format used by the data driving circuit 130, and outputs the resultant image data to the data driving circuit 130.

The controller 140 receives, from the outside (e.g., a host system), various timing signals including a vertical synchronization signal VSYNC, a horizontal synchronization signal HSYNC, an input data enable signal DE, and a clock signal, along with the image data.

The controller 140 may generate a diversity of control signals using the timing signals received from the outside and output the control signals to the gate driving circuit 120 and the data driving circuit 130.

As an example, to control the gate driving circuit 120, the controller 140 outputs various gate control signals GCS including a gate start pulse GSP, a gate shift clock GSC, and a gate output enable signal GOE.

The gate start pulse GSP controls the operation start timing of one or more gate driver integrated circuits GDICs constituting the gate driving circuit 120. The gate shift clock GSC is a clock signal commonly input to one or more gate driver integrated circuits GDICs and controls the shift timing of the scan signals. The gate output enable signal GOE designates timing information about one or more gate driver integrated circuits GDICs.

To control the data driving circuit 130, the controller 140 outputs various data control signals DCS including, e.g., a source start pulse SSP, a source sampling clock SSC, and a source output enable signal SOE.

The source start pulse SSP controls the data sampling start timing of one or more source driver integrated circuits SDICs constituting the data driving circuit 130. The source sampling clock SSC is a clock signal for controlling the sampling timing of data in each source driver integrated circuit (SDIC). The source output enable signal SOE controls the output timing of the data driving circuit 130.

The display device 100 may further include a power management integrated circuit (not shown) that supplies various voltages or currents to, e.g., the display panel 110, the gate driving circuit 120, the data driving circuit 150, and the touch driving circuit 150 or controls various voltages or currents to be supplied.

Each subpixel SP may be defined by the crossing of the gate line GL and the data line DL, and liquid crystals or a light emitting element may be disposed in each subpixel SP depending on the type of the display device 100.

As an example, when the display device 100 is a liquid crystal display device, the display device 100 may include a light source device, such as a backlight unit, to emit light to the display panel 110. Liquid crystals are disposed in the subpixel SP of the display panel 110. The alignment of liquid crystals may be adjusted by an electric field created as data voltage (Vdata) is applied to each subpixel SP, thereby representing a brightness per image data and displaying an image.

As an example, when the display device 100 is an organic light emitting display device, an organic light emitting diode (OLED) is disposed in each subpixel SP, and the current flowing to the OLED per data voltage supplied to the subpixel SP may be controlled to represent a brightness per image data supplied to the subpixel SP.

Or, in some cases, a light emitting diode (LED) may be disposed in each subpixel SP to display images.

Meanwhile, according to various aspects of the disclosure, the display device 100 may detect the user's touch on the display panel 110 using the touch driving circuit 150 and the touch electrodes TE included in the display panel 110.

As an example, the display panel 110 may include the plurality of touch electrodes (TE) and a plurality of touch lines (TL) to connect the touch electrodes TE with the touch driving circuit 150.

The touch electrodes TE may be disposed on, or embedded in, the display panel 110.

The touch electrodes TE may be electrodes used for display driving or be separate electrodes provided for touch sensing. The touch electrode TE may be a whole transparent electrode with no open area or an opaque mesh-shaped electrode. The touch electrode TE may be a transparent electrode partially having an open area.

As an example, when the display device 100 is a liquid crystal display device, the touch electrode TE may be a common electrode COM embedded in the display panel 110 and, upon display driving, having a common voltage Vcom applied thereto.

In other words, separate common electrodes COM may be arranged on the display panel 110 to be used as touch electrodes TE for touch sensing. Thus, each touch electrode TE may be disposed to overlap multiple subpixels SP.

According to various aspects of the disclosure, although the display device 100 is a liquid crystal display device, as an example, for ease of description, aspects of the disclosure are not limited thereto.

The touch electrodes TE may be electrically connected with the touch driving circuit 150 via the touch lines TL arranged on the display panel 110.

The touch driving circuit 150 may include an amplifier that outputs a touch driving signal TDS to the touch electrode TE and receives a touch sensing signal TSS from the touch electrode TE, an integrator that integrates output signals from the amplifier, and an analog-digital converter that converts the output signal from the integrator into a digital signal.

In some cases, the touch driving circuit 150 may be integrated with the data driving circuit 130.

The touch driving circuit 150 may be connected with the touch electrodes TE in a one-to-one manner to receive the touch sensing signal TSS. In other words, the touch driving circuit 150 may output the touch driving signal TDS to the touch electrode TE via the touch line TL, receive the touch sensing signal TSS, and sense a variation in self capacitance due to a touch.

The touch electrodes TE may be divided into driving electrodes and sensing electrodes, and the touch driving circuit 150 may connect to each of the driving electrodes and the sensing electrodes. In such a case, the touch driving circuit 150 may output the touch driving signal TDS to the driving electrode, receive the touch sensing signal TSS from the sensing electrode, and sense a variation in mutual capacitance between the driving electrode and sensing electrode due to a touch.

The touch driving circuit 150 converts the received touch sensing signal TSS into digital sensing data and transmits the digital sensing data to the touch controller 160.

The touch controller 160 may control the driving of the touch driving circuit 150, receive sensing data from the touch driving circuit 150, and detect the user's touch on the display panel 110 based on the received sensing data.

In other words, the touch controller 160 may detect a variation in self capacitance or mutual capacitance from the sensing data and detect, e.g., the presence or absence of a touch or the coordinates of a touch based on the detected capacitance variation.

According to various aspects of the disclosure, the display device 100 may perform touch sensing simultaneously with display driving, using the common electrodes COM as touch electrodes TE. In other words, touch sensing may be performed during the whole or part of the period when display driving is performed.

Figure 2:
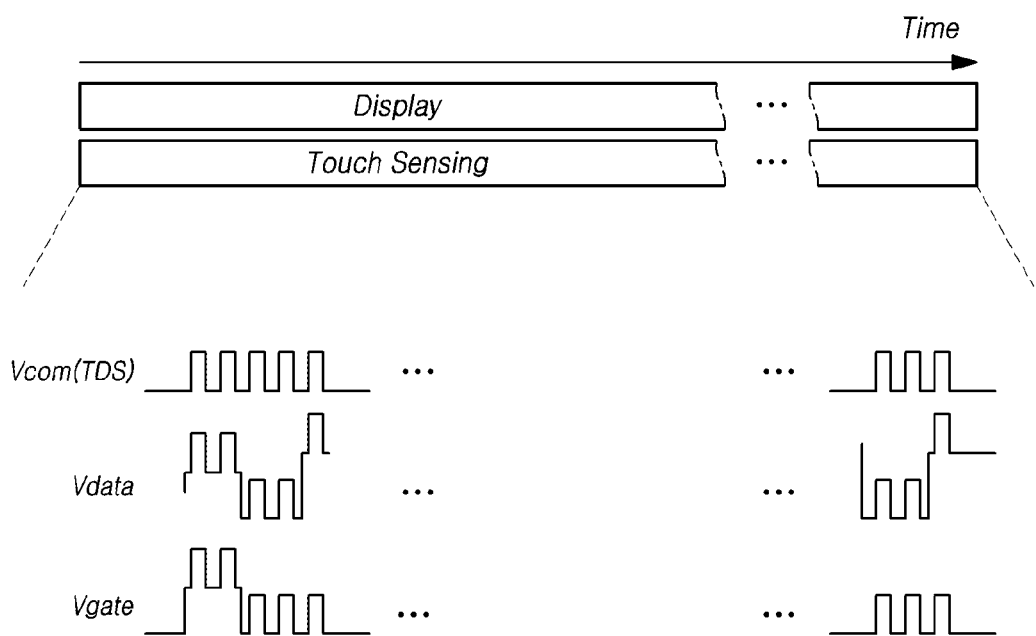
FIG. 2 is a view illustrating an example of timing of display driving and touch sensing of a display device according to the present disclosure.

FIG. 2 is a view illustrating an example of timing of display driving and touch sensing of a display device 100 according to various aspects of the disclosure.

Referring to FIG. 2, according to various aspects of the disclosure, the display device 100 may perform touch sensing simultaneously with display driving.

Here, the touch sensing period may be identical to the display driving period or may be a blank period within the display driving period. In other words, touch sensing may be independently performed regardless of display driving and, thus, touch sensing may be performed simultaneously with display driving.

When touch sensing is performed simultaneously with display driving, the touch driving signal TDS is applied to the touch electrode TE. Here, the touch driving signal TDS may be a pulse signal whose voltage varies over time. For display driving, data voltage Vdata may be supplied to the data line DL, and a scan signal generated using a gate high voltage VGH and a gate low voltage VGL may be output to the gate line GL.

At this time, when the common electrode COM of the display panel 110 is used as the touch electrode TE, the touch driving signal TDS is applied to the touch electrode TE. Thus, no voltage difference corresponding to image data may be formed between the common electrode COM and the pixel electrode PXL to which the data voltage Vdata is applied.

In other words, since the touch driving signal TDS is varied over time, no voltage difference corresponding to the image data is formed between the pixel electrode PXL and the common electrode COM to which the touch driving signal TDS is applied, so that the subpixel SP may not represent the brightness corresponding to the image data.

Thus, a voltage difference corresponding to the image data may be formed between the pixel electrode PXL and the touch driving signal (TDS)-applied common electrode COM by supplying modulated data voltage Vdata to the data line DL based on the touch driving signal TDS.

As an example, the data voltage Vdata may be modulated based on the pulse width modulation signal PWM used for generating the touch driving signal TDS.

The modulation of the data voltage Vdata may be performed, e.g., in such a manner as to modulate the gamma voltage used for generating the data voltage Vdata in the data driving circuit 130. Or, the ground voltage of the display panel 110 may be modulated so that the modulated data voltage Vdata may be supplied to the data line DL.

The gate low voltage VGL may be modulated based on the touch driving signal TDS, so that the modulated scan signal may be applied to the gate line GL, allowing the gate line GL to be normally driven.

As such, the data voltage Vdata applied to the data line DL and the scan signal applied to the gate line GL may be modulated based on the touch driving signal TDS, allowing display driving and touch sensing to be performed simultaneously.

According to various aspects of the disclosure, the display device 100 may perform touch sensing simultaneously with display driving or may perform touch sensing only during a portion of the display driving period.

Figure 3:
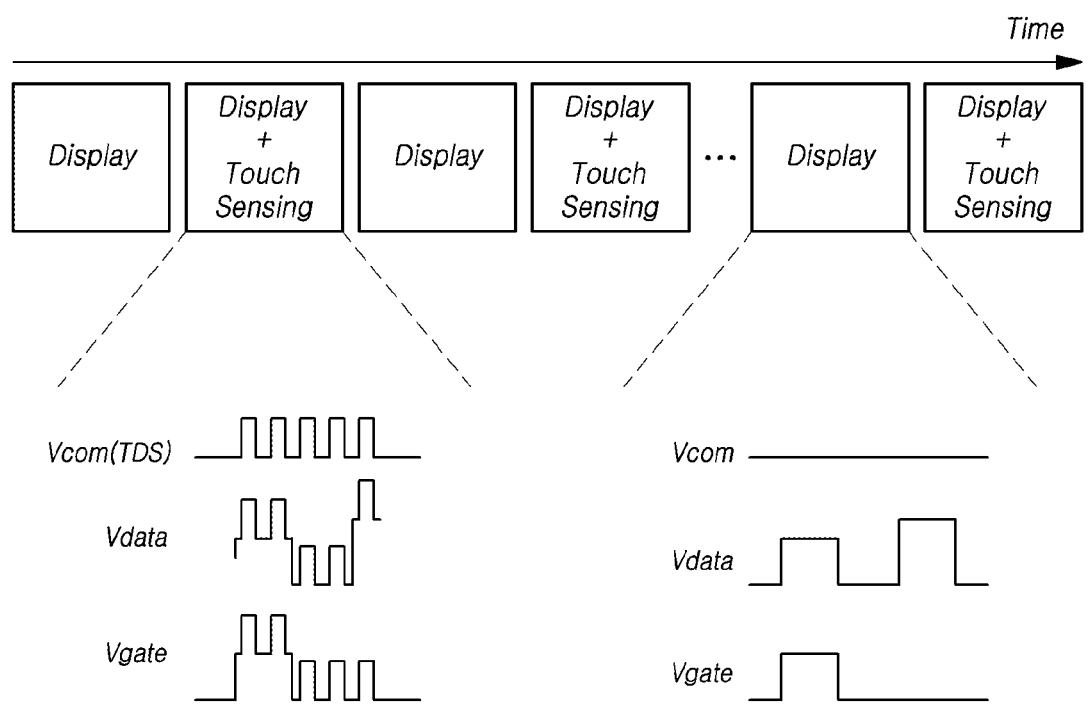
FIG. 3 is a view illustrating another example of timing of display driving and touch sensing of a display device according to the present disclosure.

FIG. 3 is a view illustrating another example of timing of display driving and touch sensing of a display device 100 according to various aspects of the disclosure.

Referring to FIG. 3, touch sensing may be performed within the display driving period.

Within the period during which display driving and touch sensing are simultaneously performed, a touch driving signal TDS for touch sensing may be applied to the common electrode COM, and data voltage Vdata modulated based on the touch driving signal TDS may be supplied to the data line DL. The scan signal modulated based on the touch driving signal TDS may be applied to the gate line GL.

This means that display driving and touch sensing are performed temporally within the same time period but not that the display driving area and touch sensing area are the same. In other words, although the modulated common voltage Vcom is supplied to the overall display panel 110 within the period during which display driving and touch sensing are simultaneously performed in one frame, the area where the data voltage Vdata is supplied and the area where the sensing signal is detected may not overlap each other.

As such, the display device 100 may supply the modulated voltage to, e.g., the common electrode COM and data line DL, displaying an image on the display panel 110 and performing touch sensing.

The display device 100 may perform display driving alone during some period within one frame.

In the period during which display driving only is performed, a predetermined level (e.g., 0V or 5.5V) of constant voltage, rather than the modulated voltage, may be applied to the common electrode COM. Further, non-modulated data voltage Vdata may be applied to the data line DL, and a non-modulated scan signal may be applied to the gate line GL. In other words, during the period when display driving alone is performed, the data voltage Vdata for display driving alone may be applied to the data line DL, and the gate voltage Vgate for display driving alone may be applied to the gate line GL.

Thus, even when touch sensing is performed simultaneously with display driving, a non-modulated constant voltage may be applied to the common electrode COM, and there may exist a period during which only display driving is performed. Further, in some cases, display driving and pen touch sensing may be performed within the period during which the constant voltage is applied to the common electrode COM.

Figure 4:
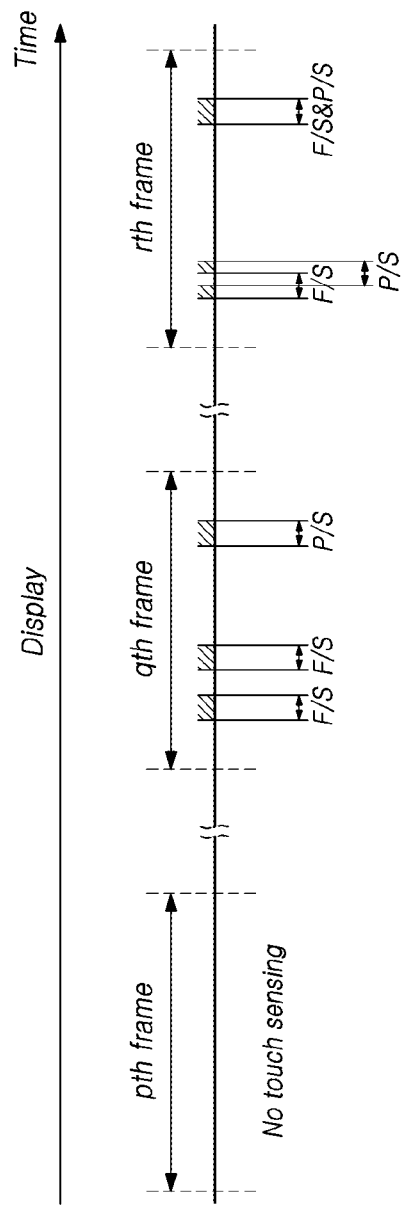
FIG. 4 is a view illustrating various examples of timing of finger sensing and pen sensing according to the display driving and touch sensing timings shown in FIG. 3.

FIG. 4 is a view illustrating various example schemes of performing finger sensing or pen sensing according to the timing of display driving and touch sensing as shown in FIGS. 2 and 3.

Referring to FIG. 4, according to various aspects of the disclosure, the display device 100 may perform display driving only and may perform touch sensing simultaneously with display driving. The display device 100 may perform touch sensing only during a portion of the display driving period and may perform finger sensing (F/S) and pen sensing (P/S) during the same or different periods.

As an example, the display device 100 may perform only display driving without touch sensing, e.g., finger sensing (F/S) and pen sensing (P/S), in one frame, e.g., the pth frame.

Or, the display device 100 may perform touch sensing, such as finger sensing (F/S) or pen sensing (P/S), during a portion, when touch sensing is needed, of the period when display driving is performed, e.g., the qth frame. Here, finger sensing (F/S) and pen sensing (P/S) may be performed during non-overlapping periods.

Or, the display device 100 may perform touch sensing during the display driving period, e.g., the rth frame, and may perform finger sensing (F/S) and pen sensing (P/S) during overlapping periods. In such a case, the respective results of the finger sensing (F/S) and pen sensing (P/S) may be differentiated by signal analysis per sensing positions or an algorithm determined by the touch controller.

Without limitations thereto, display driving and touch sensing (finger sensing or pen sensing) may independently be performed at various timings.

As touch sensing is performed independently from display driving, a sufficient touch sensing period may be secured, and the performance of touch sensing may be enhanced.

In some cases, touch sensing may be performed during a portion of the display driving period but not during another portion of the display driving period. In other words, touch sensing may be performed within a required period regardless of display driving.

At this time, different signals may be applied to the common electrode COM, which is used as the touch electrode TE, in the period during which touch sensing is performed and the period during which no touch sensing is performed. Thus, a difference in image quality may occur between the period during which the touch driving signal TDS, a modulated signal, is applied to the common electrode COM and the period during which a non-modulated common voltage Vcom is applied to the common electrode COM.

Figure 5:
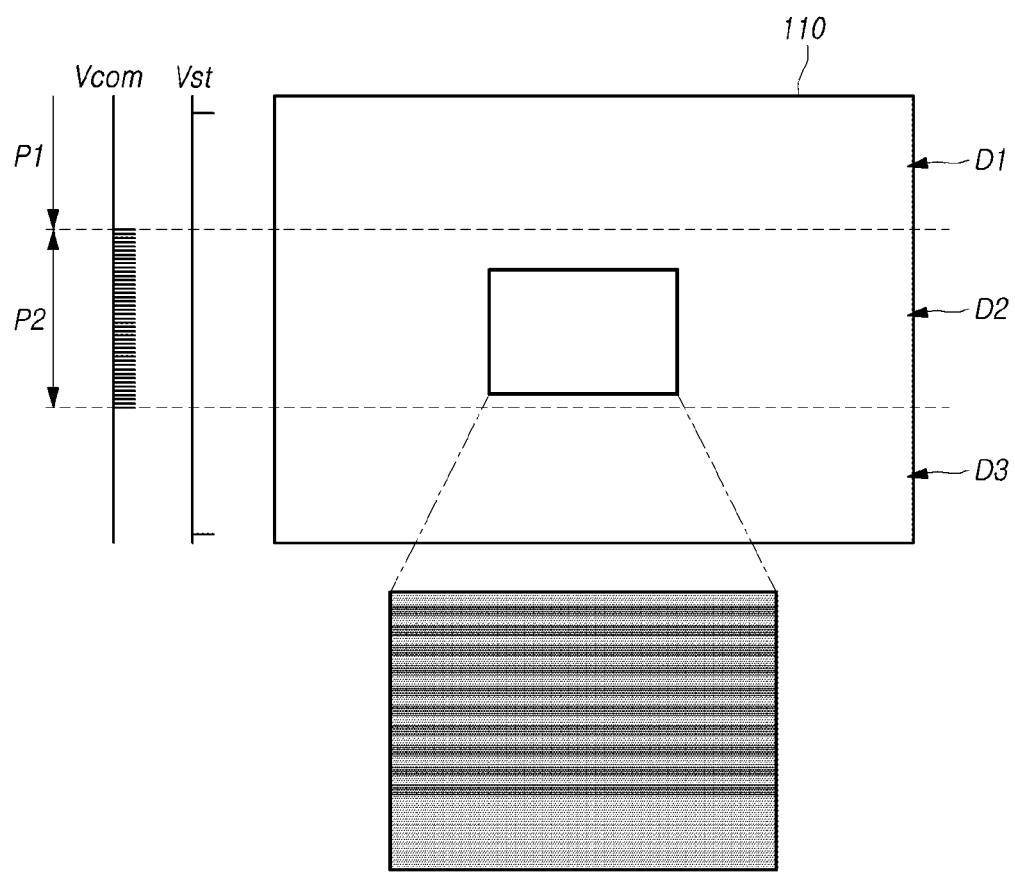
FIG. 5 is a view illustrating an example of image quality abnormality due to signals applied to a common electrode during a period when touch sensing is performed and a period when touch sensing is not performed in a display device according to the present disclosure.

FIG. 5 is a view illustrating an example of image quality abnormality due to signals applied to a common electrode COM during a period when touch sensing is performed and a period when touch sensing is not performed in a display device 100 according to various aspects of the disclosure.

Referring to FIG. 5, the first driving period P1 denotes a period during which display driving is performed, but touch sensing is not, and the second driving period P2 denotes a period during which display driving and touch sensing are performed simultaneously.

Since no touch sensing is performed in the first driving period P1, a non-modulated common voltage Vcom is applied to the common electrode COM. In the second driving period P2, a modulated touch driving signal TDS for touch sensing is applied to the common electrode COM. Further, in the second driving period P2, a modulated data voltage Vdata may be supplied to the pixel electrode PXL.

Here, as the voltage modulated based on the pulse width modulation signal PWM is applied to the common electrode COM and pixel electrode PXL in the second driving period P2, the difference between the common voltage Vcom and the data voltage Vdata may be uneven.

As an example, although the common voltage Vcom and data voltage Vdata are modulated by the same pulse width modulation signal PWM, the difference between the modulated common voltage Vcom and the modulated data voltage Vdata may be uneven due to the difference in the supply source of the pulse width modulation signal PWM. Further, the difference between the two voltages may be uneven due to a difference between the load according to an aspect the path of supplying the modulated common voltage Vcom and the load according to the path of supplying the modulated data voltage Vdata.

In such a case, an image quality abnormality may arise due to the uneven difference between the common voltage Vcom and data voltage Vdata supplied for image displaying.

As an example, as shown in FIG. 5, when a start signal Vst indicating the start of one frame is applied, scan signals are sequentially supplied to the gate lines GL arranged on the display panel 110, and display driving commences.

At this time, in the period, e.g., the first driving period P1, during which no touch sensing is performed, a common voltage Vcom, which is a non-modulated constant voltage, is applied to the common electrode COM. In the period, e.g., the second driving period P2, during which touch sensing is performed, a touchscreen display TDS, which is a modulated common voltage Vcom, may be applied to the common electrode COM. Further, a data voltage Vdata reflecting a variation in voltage due to the voltage variation in the touch driving signal TDS applied to the common electrode COM is applied to the data line DL, and a scan signal reflecting a variation in voltage due to the voltage variation in the touch driving signal TDS applied to the common electrode COM may be applied to the gate line GL.

Here, as the modulated common voltage Vcom is applied, an image quality abnormality may occur in the area where display driving is performed in the period of applying the modulated common voltage Vcom.

Thus, in the period during which display driving is performed in area D1 or D3 of the display panel 110, the constant common voltage Vcom may be applied to the common electrode COM, preventing an image quality abnormality from occurring. In contrast, as the modulated common voltage Vcom and modulated data voltage Vdata are supplied in the period during which display driving is performed in area D2, an image quality abnormality may occur in area D2.

According to various aspects of the disclosure, there is provided a way for preventing a difference in image quality that arises in the period during which a modulated touch driving signal TDS is applied and in the period during which a non-modulated common voltage Vcom is applied in a case where touch sensing is performed during at least a portion of the display driving period.

Figure 6:
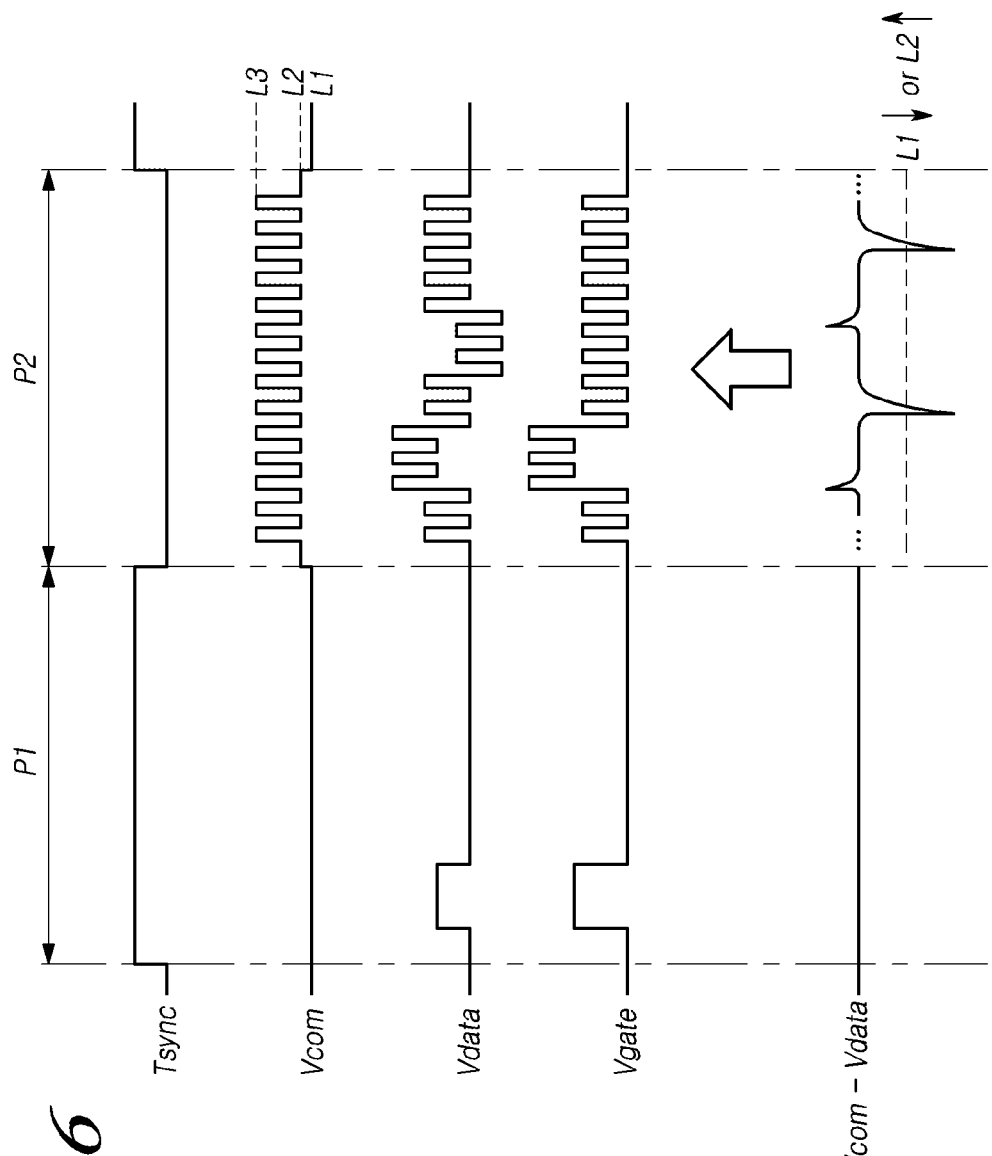
FIG. 6 is a view illustrating example signals applied to a common electrode during a period when touch sensing is performed and a period when touch sensing is not performed in a display device according to the present disclosure.

FIG. 6 is a view illustrating example signals applied to a common electrode COM during a period when touch sensing is performed and a period when touch sensing is not performed in a display device 100 according to various aspects of the disclosure.

Referring to FIG. 6, the display device 100 may refrain from touch sensing like in the first driving period P1 among the periods during which display driving is performed and may perform touch sensing like in the second driving period P2.

Whether to perform touch sensing may be controlled by a touch sync signal Tsync which may be a signal output from the touch controller 160. The touch sync signal Tsync may be a signal generated and output from the controller 140 which controls the timing of display driving and touch sensing. Although FIG. 6 illustrates an example in which touch sensing is performed in a period during which the touch sync signal Tsync is at a low level, touch sensing may be, in some case, performed in a period during which the touch sync signal Tsync is at a high level.

In the first driving period P1, a non-modulated constant common voltage Vcom is applied to the common electrode COM. The data voltage Vdata supplied to the data line DL and the scan signal supplied to the gate line GL may also be in a non-modulated form. Thus, the subpixel SP may be charged with the data voltage Vdata, and display driving may be performed.

In the second driving period P2, a touch driving signal TDS modulated based on a pulse width modulation signal is applied to the common electrode COM. Further, a data voltage Vdata modulated to correspond to the touch driving signal TDS may be applied to the data line DL, and a scan signal modulated to correspond to the touch driving signal TDS may be applied to the gate line GL.

Here, the voltage level of the common voltage Vcom applied to the common electrode COM in the first driving period P1 may be a first voltage level L1. The touch driving signal TDS applied to the common electrode COM in the second driving period P2 may be a pulse signal with a second voltage level L2 and a third voltage level L3.

At this time, the first voltage level L1 may differ from the second voltage level L2 and the third voltage level L3.

As an example, the first voltage level L1 may be lower than the second voltage level L2 and the third voltage level L3.

When the modulated voltage is applied to the common electrode COM and the pixel electrode PXL, in the first driving period P1, the difference between the common voltage Vcom and the data voltage Vdata may be even whereas in the second driving period P2, the difference between the common voltage Vcom and the data voltage Vdata applied to the pixel electrode PXL may be uneven due to application of the modulated voltage to the common electrode COM and the pixel electrode PXL.

In some cases, the peak where the difference between the common voltage Vcom and the data voltage Vdata is positive (+) may be larger than the peak where the difference between the common voltage Vcom and the data voltage Vdata is negative (−).

In such a case, the voltage level of the common voltage Vcom applied to the common electrode COM in the second driving period P2 may be allowed to be relatively higher than the voltage level of the common voltage Vcom applied to the common electrode COM in the first driving period P1.

This may be regarded as raising the second voltage level L2 of the touch driving signal TDS supplied in the second driving period P2 or as lowering the first voltage level L1 of the common voltage Vcom supplied in the first driving period P1.

Raising the second voltage level L2 of the touch driving signal TDS supplied in the second driving period P2 may render the root mean square (RMS) value of the differences between the common voltage Vcom and the data voltage Vdata in the first driving period P1 and second driving period P2 constant.

In other words, the difference between the common voltage Vcom and data voltage Vdata in the first driving period P1 and the difference between the common voltage Vcom and data voltage Vdata in the second driving period P2 may be varied by altering the minimum voltage of the touch driving signal TDS to the second voltage level L2 which is higher than the first voltage level L1 of the common voltage Vcom supplied in the first driving period P1 and driving the common electrode COM. The RMS value of the differences between the common voltage Vcom and data voltage Vdata in the first driving period P1 and the RMS value of the differences between the common voltage Vcom and data voltage Vdata in the second driving period P2 may be allowed to remain the same.

By so doing, the RMS value of the differences between the common voltage Vcom and data voltage Vdata in the first driving period P1 and second driving period P2 may be adjusted to be even.

Further, when the grayscale represented by the data voltage Vdata supplied in the first driving period P1 and second driving period P2 is constant, the RMS value of the differences between the common voltage Vcom and data voltage Vdata in the first driving period P1 and the RMS value of the differences between the common voltage Vcom and data voltage Vdata in the second driving period P2 may be identical or be rendered to fall within a predetermined range. Here, as the level of the common voltage Vcom supplied in the first driving period P1 and second driving period P2 is varied, the difference between the common voltage Vcom and data voltage Vdata may be altered although the data voltage Vdata representing the same grayscale is supplied in the first driving period P1 and second driving period P2. In other words, even when the difference between the common voltage Vcom and data voltage Vdata is varied in the first driving period P1 and second driving period P2, image quality abnormality may be prevented by adjusting the RMS value of the differences between the common voltage Vcom and data voltage Vdata in each of the periods.

As such, a difference in image quality between the first driving period P1 and second driving period P2 or an image quality abnormality in the second driving period P2 may be prevented from arising by setting different levels of voltage applied to the common electrode COM in the first driving period P1 and second driving period P2.

In other words, the voltage level of the touch driving signal TDS may be set so that no image quality abnormality occurs in the second driving period P2 during which the touch driving signal TDS modulated based on the pulse width modulation signal PWM is applied to the common electrode COM. The set voltage level of the touch driving signal TDS may differ from the voltage level of the common voltage Vcom applied to the common electrode COM in the first driving period P1.

In some cases, the first voltage level L1 of the common voltage Vcom applied to the common electrode COM in the first driving period P1 may be rendered to be higher than the second voltage level L2 of the touch driving signal TDS applied to the common electrode COM in the second driving period P2.

Figure 7:
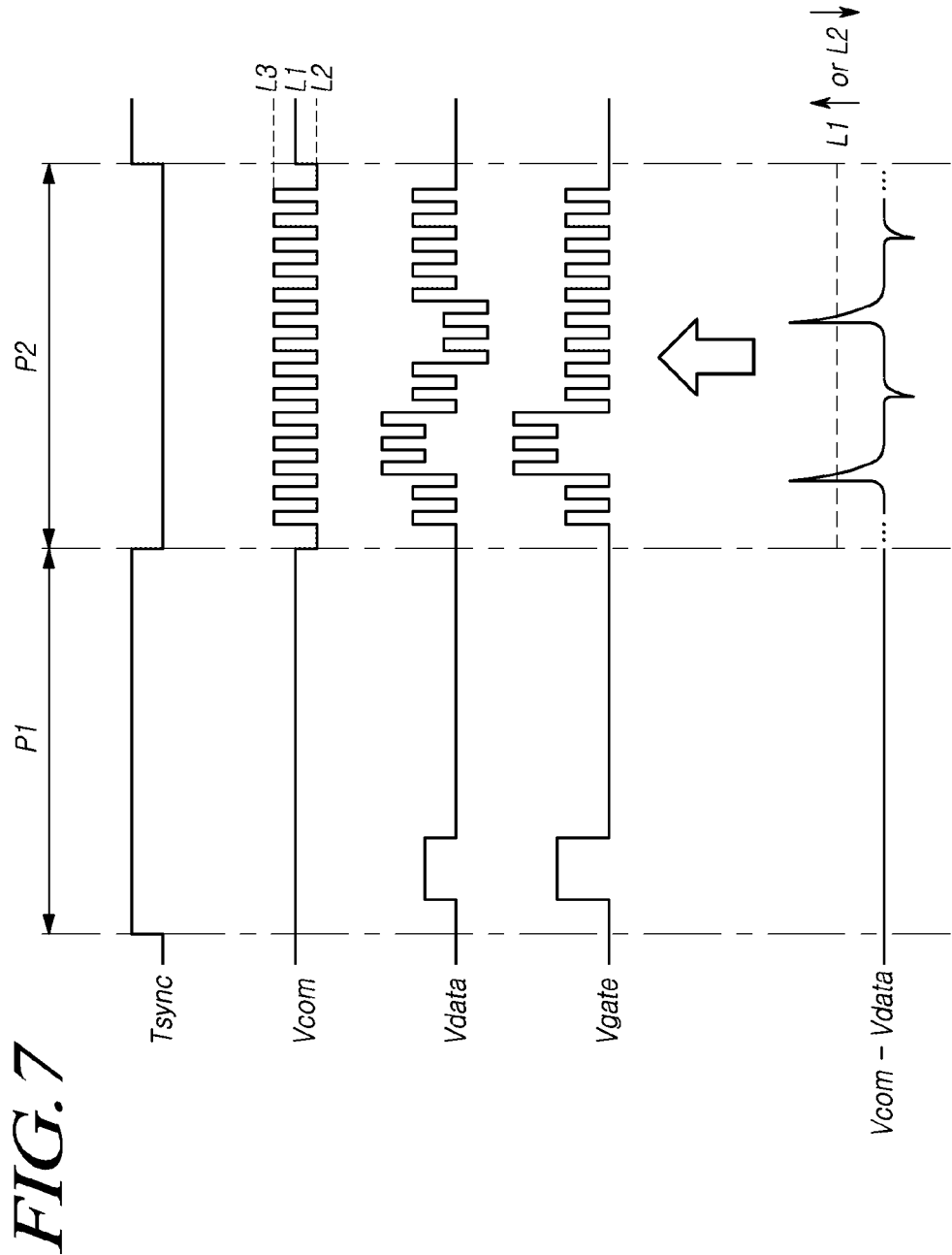
FIG. 7 is a view illustrating other example signals applied to a common electrode during a period when touch sensing is performed and a period when touch sensing is not performed in a display device according to the present disclosure.

FIG. 7 is a view illustrating other example signals applied to a common electrode COM during a period when touch sensing is performed and a period when touch sensing is not performed in a display device 100 according to various aspects of the disclosure.

Referring to FIG. 7, a non-modulated common voltage Vcom may be applied to the common electrode COM in a first driving period P1 among periods during which display driving is performed. Thus, non-modulated voltages or signals may be applied to the data line DL and gate line GL.

In a second driving period P2, a touch driving signal TDS modulated based on a pulse width modulation signal PWM may be applied to the common electrode COM. Thus, a data voltage Vdata modulated to correspond to the touch driving signal TDS may be supplied to the data line DL. A scan signal modulated to correspond to the touch driving signal TDS may be applied to the gate line GL.

Here, the common voltage Vcom applied to the common electrode COM in the first driving period P1 may have a first voltage level L1. The touch driving signal TDS applied to the common electrode COM in the second driving period P2 may be a pulse signal with a second voltage level L2 and a third voltage level L3.

In this case, the first voltage level L1 may be higher than the second voltage level L2 and lower than the third voltage level L3.

As an example, in the difference between the data voltage Vdata applied to the pixel electrode PXL via the data line DL and the touch driving signal TDS, i.e., the common voltage Vcom, applied to the common electrode COM in the second driving period P2, the positive (+) peak may be larger than the negative (−) peak as shown in FIG. 7.

In such a case, the difference between the data voltage Vdata and common voltage Vcom in the second driving period P2 may be varied by lowering the second voltage level L2 of the touch driving signal TDS applied to the common electrode COM in the second driving period P2. This may be regarded as raising the first voltage level L1 of the common voltage Vcom applied to the common electrode COM in the first driving period P1.

As the voltage level of the touch driving signal TDS applied to the common electrode COM in the second driving period P2 is adjusted, the RMS value of the differences between the data voltage Vdata and the common voltage Vcom in the second driving period P2 may be adjusted to be identical to the RMS value of the differences between the data voltage Vdata and the common voltage Vcom in the first driving period P1.

In other words, the RMS value of the differences between the data voltage Vdata applied to the pixel electrode PXL and the common voltage Vcom applied to the common electrode COM in the first driving period P1 and second driving period P2 may be adjusted to a predetermined level. Hence, an image quality abnormality may be prevented from occurring due to application of a modulated voltage to, e.g., the common electrode COM and pixel electrode PXL in the second driving period P2. Also possible is it to prevent a significant image quality difference from the first driving period P1 when a non-modulated voltage is applied to, e.g., the common electrode COM.

Further, in some cases, the period of performing touch sensing within one frame may be varied, preventing an image quality abnormality due to application of the modulated common voltage Vcom. As an example, in a case where each frame is divided into 20 periods, the modulated common voltage Vcom may be applied in the fourth, eighth, twelfth, and sixteenth periods of the first frame and in the fifth, ninth, thirteenth, and seventeenth periods of the second frame. In other words, the image quality abnormality (e.g., horizontal dimming) which occurs only in fixed areas may be dispersed and mitigated by varying, over time, the area where display driving is performed in the period during which the modulated common voltage Vcom is applied.

Figure 8:
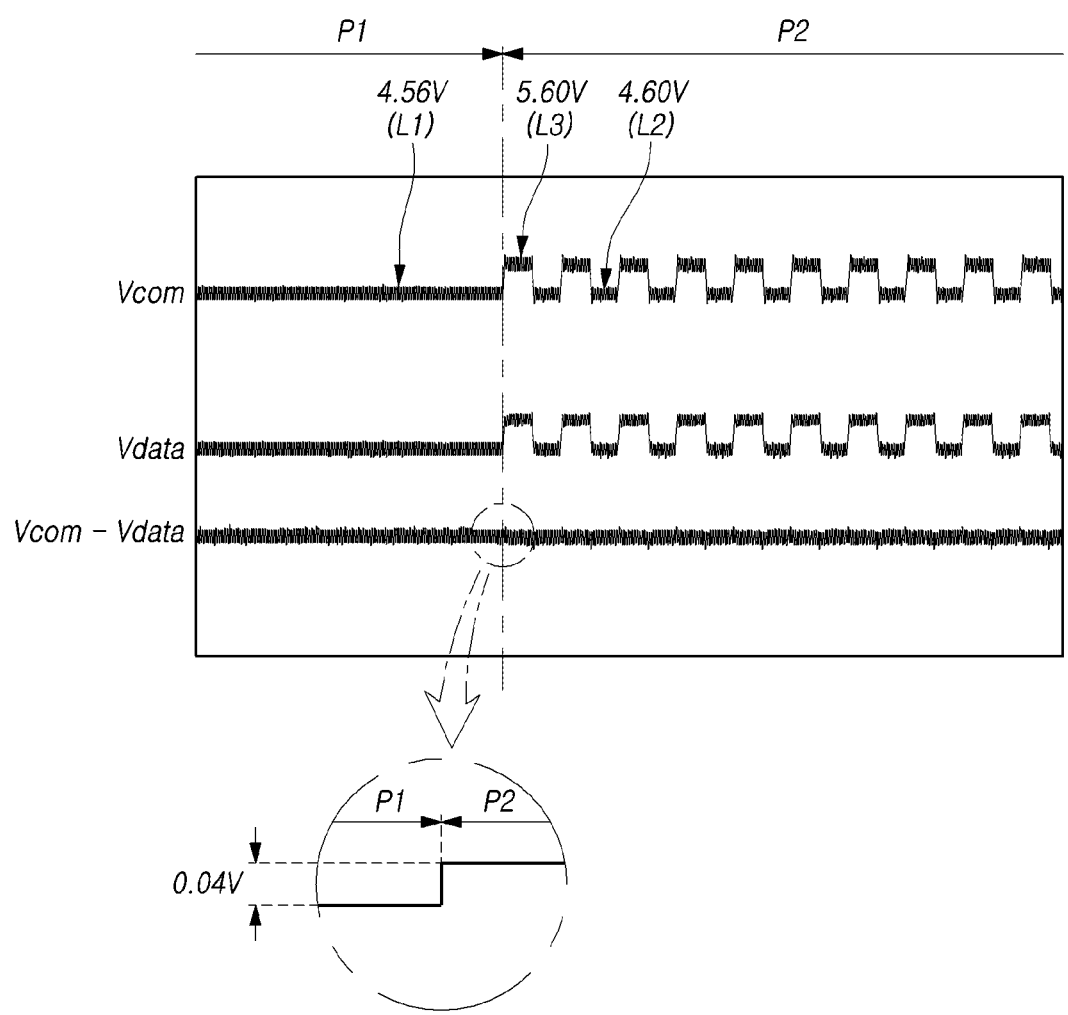
FIG. 8 is a view illustrating an example difference between common voltage and data voltage, caused by signals applied to a common electrode during a period when touch sensing is performed and a period when touch sensing is not performed in a display device according to the present disclosure.
Figure 9:
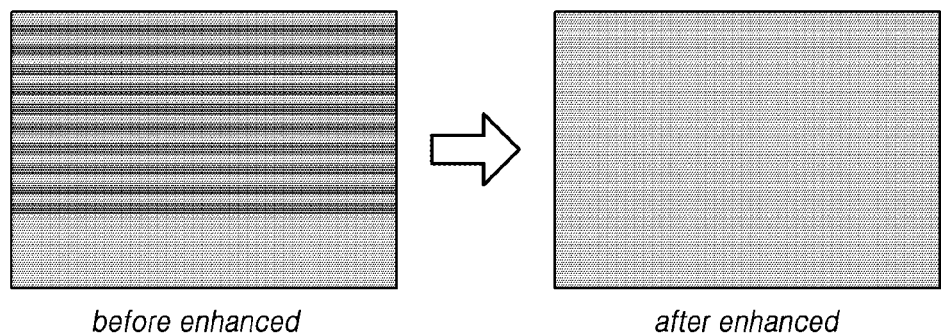
FIG. 9 is a view illustrating an example in which image quality is enhanced when a signal is applied to a common electrode according to the examples shown in FIGS. 6 to 8.

FIG. 8 is a view illustrating an example difference between common voltage Vcom and data voltage Vdata, caused by signals applied to a common electrode COM during a period when touch sensing is performed and a period when touch sensing is not performed in a display device 100 according to various aspects of the disclosure. FIG. 9 is a view illustrating an example in which image quality is enhanced when a signal is applied to a common electrode COM according to the examples shown in FIGS. 6 to 8.

Referring to FIG. 8, a non-modulated common voltage Vcom is applied to the common electrode COM in a first driving period P1. In the first driving period P1, the first voltage level L1 of the common voltage Vcom applied to the common electrode COM may be, e.g., 4.56V.

In a second driving period P2, a touch driving signal TDS modulated based on a pulse width modulation signal PWM is applied to the common electrode COM. The touch driving signal TDS may be a pulse signal with the second voltage level L2 and the third voltage level L3. As an example, the second voltage level L2 may be 4.60V, and the third voltage level L3 may be 5.60V.

In other words, FIG. 8 illustrates an example in which the first voltage level L1 of the common voltage Vcom applied to the common electrode COM in the first driving period P1 is lower than the second voltage level L2 of the touch driving signal TDS applied to the common electrode COM in the second driving period P2.

The RMS value of the differences between the data voltage Vdata applied to the pixel electrode PXL and the common voltage Vcom applied to the common electrode COM in the first driving period P1 and second driving period P2 may be rendered to be even by setting the first voltage level L1 to be lower than the second voltage level L2 of the touch driving signal TDS applied to the common electrode COM in the second driving period P2.

The RMS value of the differences between the common voltage Vcom and data voltage Vdata in the first driving period P1 and the RMS value of the differences between the common voltage Vcom and data voltage Vdata in the second driving period P2 may be adjusted to a predetermined level by allowing the difference between the common voltage Vcom and data voltage Vdata in the first driving period P1 and second driving period P2 to be varied.

In other words, since the common voltage Vcom is 4.56V in the first driving period P1 and, in the second driving period P2, the low level of the common voltage Vcom is 4.60V, the difference between the common voltage Vcom and data voltage Vdata may not be identical although the same level of data voltage Vdata is supplied in the first driving period P1 and second driving period P2.

As an example, the difference between the common voltage Vcom and data voltage Vdata in the second driving period P2 may be 0.04V larger than the difference between the common voltage Vcom and data voltage Vdata n the first driving period P1. This involves an example in which the data voltage Vdata is subtracted from the common voltage Vcom. In some cases, the difference between the common voltage Vcom and data voltage Vdata in the second driving period P2 may also be regarded as being 0.04V smaller than in the first driving period P1.

As such, although the difference between the common voltage Vcom and data voltage Vdata is varied, the RMS value of the differences between the common voltage Vcom and data voltage Vdata may be allowed to fall within a predetermined range by setting different levels for the voltage applied to the common electrode COM in the first driving period P1 and second driving period P2, thereby preventing an image quality abnormality from occurring in the period during which the modulated common voltage Vcom is applied.

Thus, even when there are a period during which a modulated signal is applied to the common electrode COM and a period during which a non-modulated signal is applied to the common electrode COM as shown in FIG. 9, it may be possible to prevent an image quality abnormality in the period during which the modulated signal is applied or a difference in image quality from that in the period during which the non-modulated signal is applied.

Figure 10:
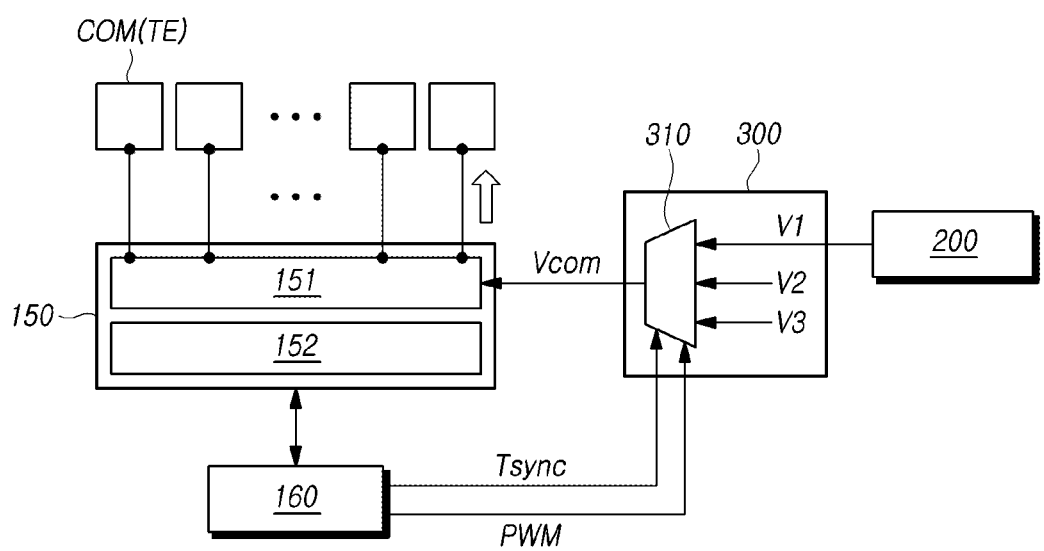
FIG. 10 is a view illustrating an example configuration of a power circuit and a touch driving circuit for outputting signals to a common electrode in a display device according to the present disclosure.

FIG. 10 is a view illustrating an example configuration of a power circuit and a touch driving circuit 150 for outputting signals to a common electrode COM in a display device 100 according to various aspects of the disclosure.

Referring to FIG. 10, a touch driving circuit 150 for driving a common electrode COM disposed on a display panel 110 may include an electrode driver 151 and a sensing signal converter 152.

The electrode driver 151 may output a non-modulated common voltage Vcom or a modulated touch driving signal TDS to the common electrode COM under the control of the touch controller 160. Upon outputting the touch driving signal TDS to the common electrode COM, the electrode driver 151 may receive a touch sensing signal TSS from the common electrode COM.

Upon receiving the touch sensing signal TSS from the touch driving signal (TDS)-applied common electrode COM, the sensing signal converter 152 may convert the touch sensing signal TSS into digital sensing data and transmit the digital sensing data to the touch controller 160.

The electrode driver 151 may output the voltage from a first power circuit 200 or second power circuit 300 to the common electrode COM.

The first power circuit 200 may generate and output a first voltage V1 with a first voltage level L1. The first power circuit 200 may be a power circuit included in the display device 100 to generate various voltages for display driving.

The first voltage V1 generated from the first power circuit 200 may be transferred to the second power circuit 300.

The second power circuit 300 may generate and output a second voltage V2 with a second voltage level L2 and a third voltage V3 with a third voltage level L3. The second voltage level L2 and the third voltage level L3 may differ from the first voltage level L1 as described above.

The second power circuit 300 may include a multiplexer 310. The multiplexer 310 may be controlled by a touch sync signal Tsync output from the touch controller 160 and may receive a pulse width modulation signal PWM.

For example, the multiplexer 310 of the second power circuit 300 may output a first voltage V1, which is received from the first power circuit 200 in a period during which the touch sync signal Tsync is at a high level, to the electrode driver 151 of the touch driving circuit 150.

The multiplexer 310 of the second power circuit 300 may output a second voltage V2 and third voltage V3, which are generated from the second power circuit 300 in a period during which the touch sync signal Tsync is at a low level, to the electrode driver 151 of the touch driving circuit 150 based on the pulse width modulation signal PWM.

Thus, the electrode driver 151 of the touch driving circuit 150 may output the first voltage V1 from the second power circuit 300 to the common electrode COM or a pulse signal of the second voltage V2 and third voltage V3 to the common electrode COM.

An image quality abnormality may be prevented from occurring due to application of the modulated common voltage Vcom to the common electrode COM by setting the first voltage V1, second voltage V2, and third voltage V3 so that the RMS value of the differences between the common voltage Vcom applied to the common electrode COM and the data voltage Vdata applied to the pixel electrode PXL falls within a predetermined range.

The above description has been presented to enable any person skilled in the art to make and use the technical idea of the disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the disclosure. The above description and the accompanying drawings provide an example of the technical idea of the disclosure for illustrative purposes only. That is, the disclosed aspects are intended to illustrate the scope of the technical idea of the disclosure. Thus, the scope of the disclosure is not limited to the aspects shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A display device, comprising:
a plurality of pixels;
a plurality of data lines electrically connected with the plurality of pixels;
a plurality of touch electrodes overlapping at least a part of the plurality of pixels;
a first circuit configured to output a data signal to the plurality of data lines; and
a second circuit configured to output a first signal having a first voltage level to at least one touch electrode among the plurality of touch electrodes during a first period, and a second signal alternating between a second voltage level and a third voltage level to the at least one touch electrode during a second period,
wherein the data signal includes an alternating signal corresponding to the second signal during the second period.

2. The display device of claim 1, wherein the third voltage level is greater than the first voltage level.

3. The display device of claim 1, wherein the first voltage level is between the second voltage level and the third voltage level.

4. The display device of claim 1, wherein the second voltage level is between the first voltage level and the third voltage level.

5. The display device of claim 1, wherein the first period is a period for sensing a pen, and the second period is a period for sensing a finger.

6. The display device of claim 1, wherein the data signal is supplied to the plurality of data lines during the first period and the second period.

7. The display device of claim 1, wherein a level of a signal supplied to the at least one touch electrode is changed at a point between the first period and the second period.

8. The display device of claim 1, wherein a difference between a root mean square (RMS) value of differences between the first signal and the data signal applied during the first period and an RMS value of differences between the second signal and the data signal applied during the second period falls within a preset range when a grayscale represented by a data signal applied in the first period is identical to a grayscale represented by a data signal applied during the second period.

9. The display device of claim 1, further comprising:
a first power circuit configured to output a first voltage having the first voltage level; and
a second power circuit configured to output a second voltage having the second voltage level and a third voltage having the third voltage level,
wherein the second power circuit is configured to output the first voltage from the first power circuit to the second circuit or output a modulated signal having the second voltage and the third voltage to the second circuit.

10. The display device of claim 1, wherein the second circuit is configured to receive a sensing signal from at least one touch electrode during the second period.

11. A touch circuit, comprising:
a first circuit configured to output a data signal to the plurality of data lines; and
a second circuit configured to output a first signal having a first voltage level to at least one touch electrode among a plurality of touch electrodes during a first period, and a second signal alternating between a second voltage level and a third voltage level to the at least one touch electrode during a second period, wherein the data signal includes an alternating signal corresponding to the second signal during the second period, and
an electrode driver configured to output a first signal having a first voltage level to at least one touch electrode of a plurality of touch electrodes disposed on a panel during a first period, and a second signal alternating between a second voltage level and a third voltage level to the at least one touch electrode during a second period.

12. The touch circuit of claim 11, wherein the third voltage level is greater than the first voltage level.

13. The touch circuit of claim 11, wherein the first voltage level is between the second voltage level and the third voltage level.

14. The touch circuit of claim 11, wherein the second voltage level is between the first voltage level and the third voltage level.

15. The touch circuit of claim 11, further comprising:
a first power circuit configured to output a first voltage having the first voltage level; and
a second power circuit configured to output a second voltage having the second voltage level and a third voltage having the third voltage level.

16. The touch circuit of claim 15, wherein the second power circuit is configured to output the first voltage supplied from the first power circuit to the second circuit or output a modulated signal having the second voltage and the third voltage to the second circuit.

* * * * *